(12) United States Patent
Dargavell et al.

(10) Patent No.: US 6,673,288 B2
(45) Date of Patent: Jan. 6, 2004

(54) MULTI ELEMENT MOVING VACUUM CHAMBER AND PROCESS FOR POWDER SLUSH PLASTIC CASTING

(75) Inventors: Andrew L. Dargavell, Oxford, MI (US); Gregg S. Evans, Windsor (CA)

(73) Assignee: Intertec Systems, Troy, MI (US)

( * ) Notice: Subject to any disclaimer, the term of this patent is extended or adjusted under 35 U.S.C. 154(b) by 0 days.

(21) Appl. No.: 10/163,350

(22) Filed: Jun. 7, 2002

(65) Prior Publication Data

US 2003/0227103 A1 Dec. 11, 2003

(51) Int. Cl.[7] .................. B29C 41/04; B29C 41/50
(52) U.S. Cl. .............. 264/102; 264/302; 264/306; 264/309; 264/310; 264/311; 264/DIG. 60; 425/144; 425/435; 425/470
(58) Field of Search .................. 264/301, 302, 264/309, 310, 311, 101, 102, 306, DIG. 60; 425/435, 144, 420

(56) References Cited

U.S. PATENT DOCUMENTS

| | | | | |
|---|---|---|---|---|
| 3,692,457 A | * | 9/1972 | Pekor | 425/435 |
| 4,664,864 A | * | 5/1987 | Wersosky | 264/301 |
| 4,714,424 A | | 12/1987 | Kinugasa et al. | 425/388 |
| 4,740,337 A | | 4/1988 | Gale et al. | 264/40.6 |
| 4,790,510 A | | 12/1988 | Takamatsu et al. | 249/117 |
| 4,898,697 A | | 2/1990 | Horton | 264/37 |
| 4,946,638 A | | 8/1990 | Takamatsu | 264/302 |
| 5,221,539 A | | 6/1993 | Pallerberg et al. | 425/144 |
| 5,290,499 A | | 3/1994 | Tischler | 264/301 |
| 5,356,589 A | * | 10/1994 | Sugalski | 264/265 |
| 5,387,390 A | | 2/1995 | Kornylo | 264/46.8 |
| 5,397,409 A | | 3/1995 | Kornylo | 156/79 |
| 5,407,631 A | * | 4/1995 | Salisbury | 264/517 |
| 5,580,501 A | | 12/1996 | Gallagher et al. | 264/45.3 |
| 5,840,236 A | | 11/1998 | Ngoc | 264/302 |
| 5,932,162 A | | 8/1999 | Johno | 264/302 |
| 6,019,590 A | | 2/2000 | McNally | 425/470 |
| 6,082,989 A | | 7/2000 | McNally | 425/435 |
| 6,099,771 A | | 8/2000 | Hudkins et al. | 264/102 |
| 6,589,470 B2 | * | 7/2003 | Fried et al. | 264/443 |

FOREIGN PATENT DOCUMENTS

JP          62-023720      *   1/1987   ......... B29C/41/04

* cited by examiner

Primary Examiner—Stefan Staicovici
(74) Attorney, Agent, or Firm—Dykema Gossett PLLC

(57) ABSTRACT

A multi element moving vacuum chamber (MEMVC) for rotational casting includes a mold having a predefined shape and an axis of rotation, and a box containing casting material. The MEMVC further includes a first vacuum element mounted to an outer mold surface and a second vacuum element mounted to an outer box surface. The mold and the box are detachably engageable with each other to define an engaged configuration in which air present in an enclosed area defined by the outer mold surface and an inner surface of the first vacuum element, by an inner mold surface and an inner box surface, and by the outer box surface and an inner surface of the second vacuum element, is removed to create a vacuum. Alternatively, the mold and/or the box may be constructed with vacuum loading capability, thereby eliminating the need for the first and/or the second vacuum elements.

23 Claims, 4 Drawing Sheets

(RELATED ART)

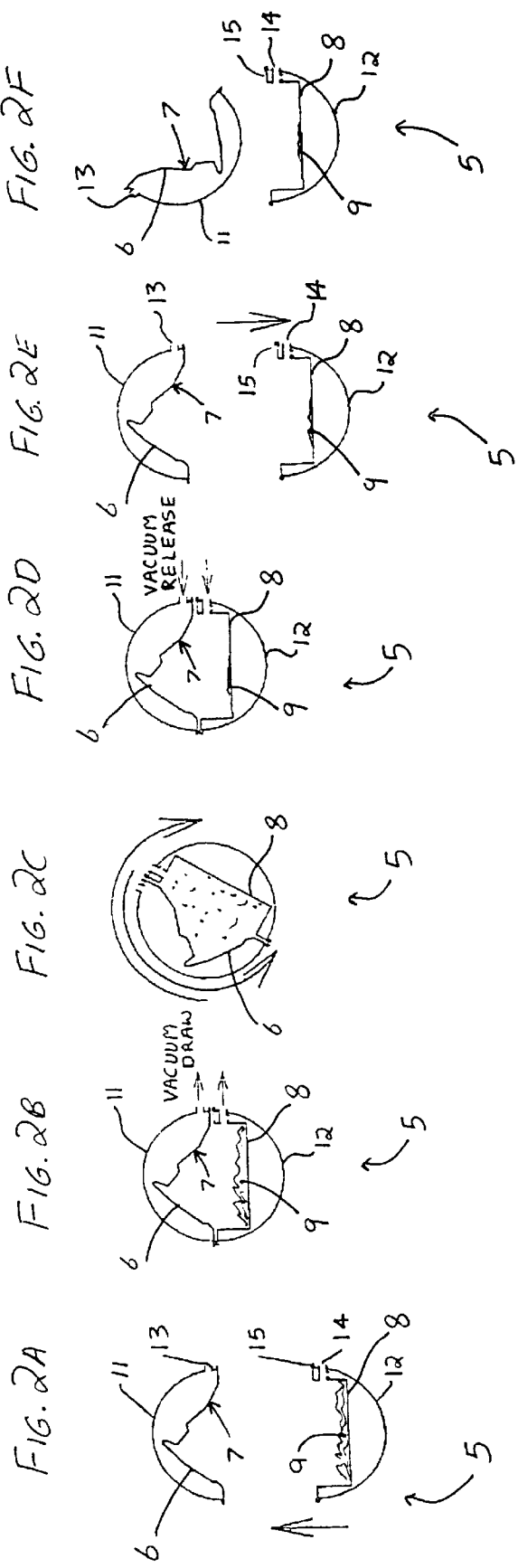

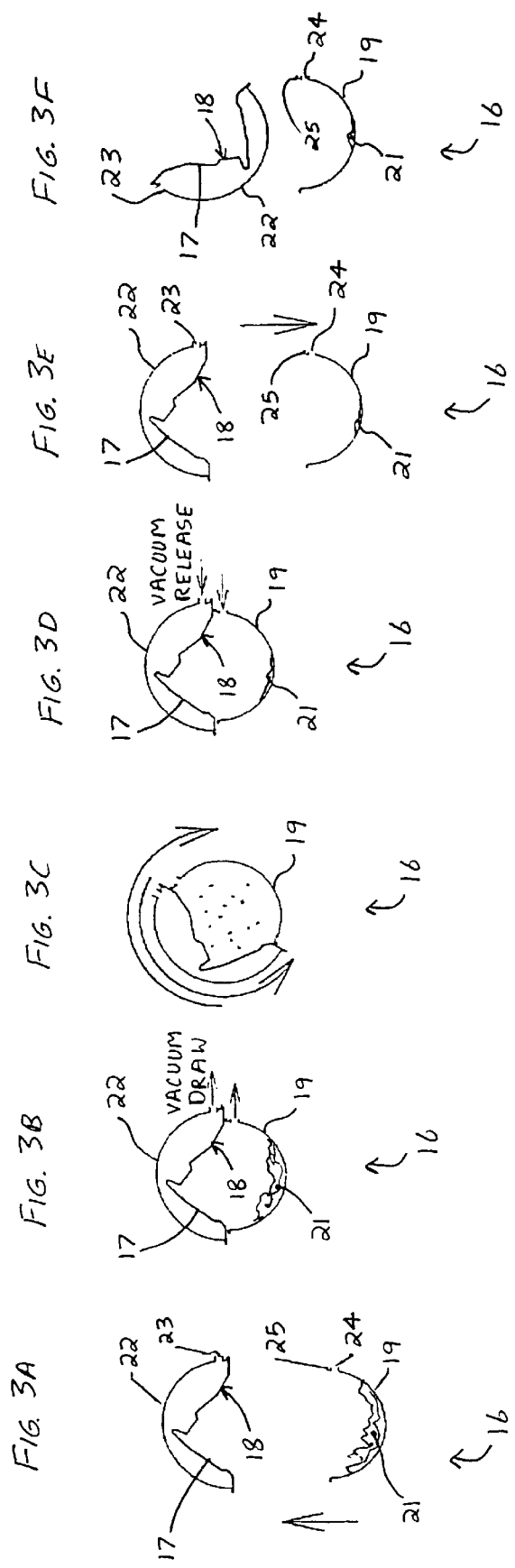

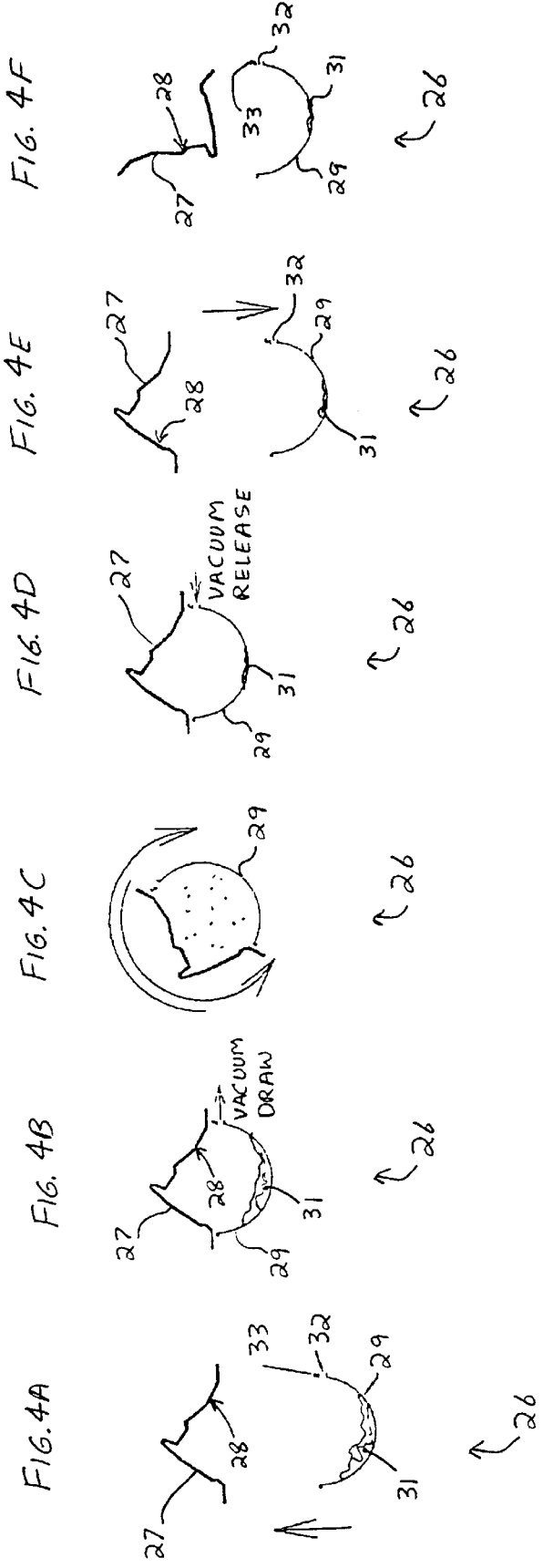

MULTI ELEMENT MOVING VACUUM CHAMBER AND PROCESS FOR POWDER SLUSH PLASTIC CASTING

BACKGROUND OF INVENTION a. Field of Invention

The invention relates generally to a method and apparatus for plastic casting, and, more particularly to a method and apparatus for powder slush plastic casting using a multi element moving vacuum chamber, surrounding a casting tool and a powder box, for reducing imperfections such as pin holes, surface voiding and skin thickness variations in a finished cast product.

b. Description of Related Art

A need exists for an improved method and apparatus for powder slush plastic casting, for example in skinned automotive instrument panel manufacturing, whereby common defects such as pin holes, surface voiding and skin thickness variations may be reduced.

Powder slush casting (or molding) of thin-walled articles from castable plastic material, such as plastisol and pourable plastic powders, is a well known method of manufacturing molded plastic articles, such as hollow articles, automotive dashboards, door panels and the like. Powder slush casting is particularly useful in the manufacture of hollow articles since the wall thickness of the article can be controlled by adjusting the amount of plastisol or plastic powder used in the casting process. Examples of commonly used plastic powders include Thermo Plastic Urethane (T.P.U.), Thermo Plastic Olefinic (T.P.O.) and Poly Vinyl Chloride (P.V.C.).

In conventional slush casting, a mold is first preheated. FIGS. 1A–1F are exemplary diagrams of a related art powder casting cycle illustrating the key stages of a conventional casting cycle. As shown in FIGS. 1A and 1B, a powder box 1, filled with plastic powder 2 is then brought into contact with pre-heated mold 3 and engaged with it to prevent leakage of plastic powder 2. As next shown in FIG. 1C, when mold 3 is rotated, plastic powder 2 strikes the heated mold surface 4. When mold 3 stops rotating, powder 2 on mold surface 4 fuses to form the shape of mold surface 4 (see FIG. 1D), and any remaining plastic powder 2 drains back into powder box 1 for subsequent casting, or is discarded. As shown in FIG. 1E, powder box 1 is then disengaged from mold 3 and returned to its original location (shown also in FIG. 1A). Finally, as shown in FIG. 1F, mold 3 is rotated to allow an operator to remove the fused layer (or skin) on mold surface 4.

In the conventional slush casting method and apparatus discussed above, pin holes, surface voiding and skin thickness variations are common defects. In automotive panels for example, pin holes cause urethane foam leakage, and skin thickness variations cause subtle distortions in the finished part's surface. From a quality stand-point, these defects detract from the product's appearance, and from a manufacturing stand-point, these defects are the cause of significant scrap levels.

In the art, there currently exist various methods and apparatus for slush casting, as disclosed for example in U.S. Pat. Nos. 6,099,771, 6,082,989, 6,019,590, 5,932,162, 5,840,236, 5,580,501, 5,397,409, 5,387,390, 5,290,499, 5,221,539, 4,946,638, 4,898,697, 4,790,510, 4,740,337, and 4,714,424. The slush casting methods and apparatus disclosed in these patents share the disadvantages of pin holes, surface voiding and skin thickness variations in the finished cast product, as discussed above.

SUMMARY OF INVENTION

The invention solves the problems and overcomes the drawbacks and disadvantages of the prior art by providing a method and apparatus for powder slush plastic casting, which minimizes defects such as pin holes and evens plastic flow to reduce thickness variations in a finished product, and which is relatively simple and inexpensive to install and operate.

In particular, the invention accomplishes this by providing three embodiments of a multi element moving vacuum chamber (MEMVC) for rotational casting. The first embodiment of the MEMVC includes a mold having a predefined shape and an axis of rotation. The mold is rotatable about the axis of rotation, and includes an inner mold surface and an outer mold surface. The MEMVC further includes a box containing casting material. The box has an inner box surface for holding the casting material and an outer box surface. A first vacuum element is mounted to the outer mold surface and a second vacuum element is mounted to the outer box surface. The mold and the first vacuum element are detachably engageable with the box and the second vacuum element to define an engaged configuration. When the mold, the box and the first and second vacuum elements are in the engaged configuration, air within an enclosure defined by the outer mold surface and an inner surface of the first vacuum element, by the inner mold surface and the inner box surface, and by the outer box surface and an inner surface of the second vacuum element, may be removed to create a vacuum.

In the first embodiment of the MEMVC discussed above (and for the second and third embodiments discussed below), the mold may made of Nickel or another metal. The casting material may be Thermo Plastic Urethane (T.P.U.), Thermo Plastic Olefinic (T.P.O.), Poly Vinyl Chloride (P.V.C.), or a castable plastic. The first and second vacuum elements may be bell shaped, and may each include a vacuum connection for removal of air from an enclosed area defined by the inner surface of the first vacuum element and the outer mold surface, by the inner surface of the second vacuum element and the outer box surface, and further defined by the inner mold surface and the inner box surface. The mold, the first vacuum element, the box and the second vacuum element may further include a vacuum rated seal for providing sealed engagement between each of the mold and the first vacuum element, and the box and the second vacuum element. The mold, the box, the first vacuum element and the second vacuum element may further include a latch (on each) for permitting detachable engagement between the mold and the first vacuum element, and the box and the second vacuum element.

The second embodiment of the MEMVC for rotational casting includes a mold having a predefined shape and an axis of rotation. The mold is rotatable about the axis of rotation and further includes an inner mold surface and an outer mold surface. The MEMVC further includes a box containing casting material. The box has an inner box surface for holding the casting material and an outer box surface. The MEMVC yet further includes a vacuum element mounted to either the outer mold surface or the outer box surface, thereby defining a vacuum element mounted component and a non-vacuum element mounted component. Specifically, if a vacuum element is mounted on the mold, the vacuum element mounted component would be the mold with the vacuum element, and if a vacuum element is mounted to the box, then the vacuum element mounted component would be the box with the vacuum element. The non-vacuum element mounted component is capable of vacuum loading. The mold is detachably engageable with the box, and the vacuum element is detachably engageable with the non-vacuum element mounted component, to define an engaged configuration. When the mold, the box, and the vacuum element are in the engaged configuration, air within an enclosure defined by the inner mold surface and the inner box surface, and further defined by an outer surface of the vacuum element mounted component and an inner surface of the vacuum element, may be removed to create a vacuum.

The third embodiment of the MEMVC for rotational casting includes a mold having a predefined shape and an axis of rotation. The mold is rotatable about the axis of rotation and has an inner mold surface and an outer mold surface. The mold is also capable of vacuum loading. The MEMVC also includes a box containing casting material. The box has an inner box surface for holding the casting material and an outer box surface, and is also capable of vacuum loading. The mold is detachably engageable with the box to define an engaged configuration. When the mold and the box are in the engaged configuration, air within an enclosure defined by the inner mold surface and the inner box surface may be removed to create a vacuum.

In yet another aspect of the invention, the invention solves the problems and overcomes the drawbacks and disadvantages of the prior art by providing a first method for rotatable casting. The method includes providing a mold having a predefined shape and an axis of rotation. The mold has an inner mold surface and an outer mold surface. The method further includes providing a box containing casting material and having an inner box surface for holding the casting material and an outer box surface. The box is located relative to the mold at a first location. The method then includes the steps of mounting a first vacuum element to the outer mold surface and mounting a second vacuum element to the outer box surface. Next, the method includes the steps of heating the mold to a predetermined temperature and moving the mold relative to the box to engage the mold with the box and the first vacuum element with the second vacuum element, thereby defining an engaged configuration. In the engaged configuration, the method includes the step of removing air within an enclosure defined by an inner surface of the first vacuum element and the outer mold surface, by an inner surface of the second vacuum element and the outer box surface, and by the inner mold surface and the inner box surface, in order to create a vacuum in the enclosure.

The invention also provides a second method for rotatable casting, which includes providing a mold having a predefined shape and an axis of rotation. The mold has an inner mold surface and an outer mold surface. The method further includes providing a box containing casting material and having an inner box surface for holding the casting material and an outer box surface. The box is located relative to the mold at a first location. The method then includes the step of mounting at least one vacuum element to one of the outer mold surface or the outer box surface, thereby defining a vacuum element mounted component and a non-vacuum element mounted component. The non-vacuum element mounted component is capable of vacuum loading. The method yet further includes the steps of heating the mold to a predetermined temperature, and moving the mold relative to the box to engage the mold with the box, thereby defining an engaged configuration. In the engaged configuration, the method includes the step of removing air within an enclosure defined by an inner surface of the vacuum element and an outer surface of the vacuum element mounted component, and by the inner mold surface and the inner box surface, in order to create a vacuum in the enclosure.

The invention also provides a third method for rotatable casting, which includes providing a mold having a predefined shape and an axis of rotation. The mold has an inner mold surface and an outer mold surface, and is capable of vacuum loading. The method further includes providing a box containing casting material. The box has an inner box surface for holding the casting material and an outer box surface. The box is located relative to the mold at a first location and is capable of vacuum loading. The method then includes the steps of heating the mold to a predetermined temperature and moving the mold relative to the box to engage the mold with the box, thereby defining an engaged configuration. In the engaged configuration, the method includes the step of removing air within an enclosure defined by the inner mold surface and the inner box surface.

It should be noted that the first through third methods for rotatable casting, discussed above, include all the features of the first through third embodiments of the MEMVC, discussed above.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings:

FIGS. 2A–2F are exemplary diagrams of a first preferred embodiment of a multi element moving vacuum chamber powder slush casting cycle illustrating the claimed apparatus and the key stages of a casting cycle for the first embodiment;

FIGS. 3A–3F are exemplary diagrams of a second preferred embodiment of a multi element moving vacuum chamber powder slush casting cycle illustrating the claimed apparatus and the key stages of a casting cycle for the second embodiment; and FIGS. 4A–4F are exemplary diagrams of a third preferred embodiment of a multi element moving vacuum chamber powder slush casting cycle illustrating the claimed apparatus and the key stages of a casting cycle for the third embodiment.

DETAILED DESCRIPTION OF THE PREFERRED EMBODIMENT

First Preferred Embodiment

Figures 1A, 1B, 1C, 1D, 1E, 1F:
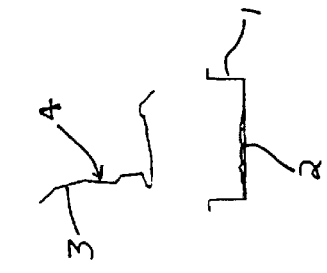
FIGS. 1A–1F are exemplary diagrams of a related art powder casting cycle illustrating the key stages of a conventional casting cycle.

As shown in FIG. 2A, a first preferred embodiment of the Multi Element Moving Vacuum Chamber (MEMVC) assembly generally designated 5 may include mold 6 having mold surface 7. MEMVC assembly 5 may also include powder box 8 having disposed therein plastic powder 9. MEMVC assembly 5 may further include a bell-shaped vacuum element 11 mounted onto the outer surface of mold 6 and a similar bell-shaped vacuum element 12 mounted onto the outer surface of powder box 8. Vacuum element 11 may include vacuum connection 13 for drawing and releasing vacuum by means of a conventional pump (not shown). Similarly, vacuum element 12 may also include a vacuum connection 14 for drawing and releasing vacuum, and a vacuum rated seal 15 for maintaining a seal between mold 6 and powder box 8.

Mold 6 may be made of a metal such as nickel, a metallic material, or any equivalent material known in the art. Plastic powder 9 may be a powder such as Thermo Plastic Urethane (T.P.U.), Thermo Plastic Olefinic (T.P.O.), Poly Vinyl Chloride (P.V.C.), or any equivalent material that may be used with mold 6 to form a cast product. Additionally, plastic powder 9 may have a fine or granulated composition, or may be a liquid. Vacuum elements 11 and 12 may be shaped in any way necessary to partially or fully seal mold 6 and/or powder box 8, and may be bell shaped (as shown in FIG. 2A), or any equivalent shape, as would be apparent to a skilled artisan. Vacuum rated seal 15 may be placed on vacuum element 12 (as shown in FIG. 2A), or may likewise be placed on mold 6, powder box 8, and/or vacuum element 11.

As shown next in FIG. 2A, in order to cast plastic powder 9 into the shape of mold surface 7, mold 6 may first be heated in a hot air furnace (not shown) to a predetermined optimum molding temperature. As shown in FIGS. 2A and 2B, powder box 8 may then be brought into contact with mold 6 and engaged with it in order to prevent leakage of plastic powder 9. Next, as shown in FIG. 2B, air present in the enclosed area defined by an outer surface of mold 6 and an inner surface of vacuum element 11, by mold surface 7 and the inner surface of powder box 8, and by the outer surface of powder box 8 and an inner surface of vacuum element 12, may be removed through vacuum connections 13 and 14 to simultaneously form a seal between mold 6 and powder box 8 via vacuum rated seal 15. The vacuum level may range between atmospheric and absolute vacuum. As shown in FIG. 2C, mold 6 may now be rotated, at which state plastic powder 9 strikes heated mold surface 7. After a predetermined time period, rotation of mold 6 is stopped as shown in FIG. 2D and vacuum within the enclosed area discussed above is released. At this stage in FIG. 2D, when mold 6 stops rotating, plastic powder 9 on mold surface 7 fuses to form the shape of mold surface 7. Any remaining plastic powder 9 drains back into powder box 8 for subsequent casting, or may be discarded. As shown next in FIG. 2E, powder box 8 may now be disengaged from mold 6 and returned to its original location (shown also in FIG. 2A). Finally, as shown in FIG. 2F, mold 6 may be rotated to a predetermined orientation to allow an operator to remove the fused layer (or skin) on mold surface 7.

Second Preferred Embodiment

Next, as shown in FIG. 3A, a second preferred embodiment of the Multi Element Moving Vacuum Chamber (MEMVC) assembly generally designated 16 may include mold 17 having mold surface 18. MEMVC assembly 16 may also include powder box 19 having disposed therein plastic powder 21. MEMVC assembly 16 may further include a bell-shaped vacuum element 22 mounted onto the outer surface of mold 17, and powder box 19 may be formed to hold vacuum pressure (i.e. vacuum loading), when engaged with mold 17 (discussed below). Vacuum element 22 may include vacuum connection 23 for drawing and releasing vacuum by means of a conventional pump (not shown). Similarly, powder box 19 may also include a vacuum connection 24 for drawing and releasing vacuum, and a vacuum rated seal 25 for maintaining a seal between mold 17 and powder box 19.

Mold 17 may be made of a metal such as nickel, a metallic material, or any equivalent material known in the art. Plastic powder 21 may be a powder such as Thermo Plastic Urethane (T.P.U.), Thermo Plastic Olefinic (T.P.O.), Poly Vinyl Chloride (P.V.C.), or any equivalent material that may be used with mold 17 to form a cast product. Additionally, plastic powder 21 may have a fine or granulated composition, or may be a liquid. Vacuum element 22 may be shaped in any way necessary to partially or fully seal mold 17, and may be bell shaped (as shown in FIG. 3A), or any equivalent shape, as would be apparent to a skilled artisan. Vacuum rated seal 25 may be placed on powder box 19 (as shown in FIG. 3A), or may likewise be placed on mold 17 and/or vacuum element 22.

As shown next in FIG. 3A, in order to cast plastic powder 21 into the shape of mold surface 18, mold 17 may first be heated to a predetermined optimum molding temperature. As shown in FIGS. 3A and 3B, powder box 19 may then be brought into contact with mold 17 and engaged with it in order to prevent leakage of plastic powder 21. Next, as shown in FIG. 3B, air present in the enclosed area defined by an outer surface of mold 17 and an inner surface of vacuum element 22, and by mold surface 18 and the inner surface of powder box 19, may be removed through vacuum connections 23 and 24 to simultaneously form a seal between mold 17 and powder box 19 via vacuum rated seal 25. The vacuum level may range between atmospheric and absolute vacuum. As shown in FIG. 3C, mold 17 may now be rotated, at which state plastic powder 21 strikes mold surface 18. After a predetermined time period, rotation of mold 17 is stopped as shown in FIG. 3D and vacuum within the enclosed area discussed above is released. At this stage in FIG. 3D, when mold 17 stops rotating, plastic powder 21 on mold surface 18 fuses to form the shape of mold surface 18. Any remaining plastic powder 21 drains back into powder box 19 for subsequent casting, or may be discarded. As shown next in FIG. 3E, powder box 19 may now be disengaged from mold 17 and returned to its original location (shown also in FIG. 3A). Finally, as shown in FIG. 3F, mold 17 may be rotated to a predetermined orientation to allow an operator to remove the fused layer (or skin) on mold surface 18.

It should be evident from the above discussion that for the second embodiment of MEMVC assembly 16, instead of vacuum element 22 being mounted on mold 17 and powder box 19 being capable of vacuum loading, a vacuum element may likewise be mounted on powder box 19 (which may not capable of vacuum loading) and mold 17 may instead be designed with vacuum loading capabilities, as would be evident to a skilled artisan.

Third Preferred Embodiment

As shown in FIG. 4A, a third preferred embodiment of the Multi Element Moving Vacuum Chamber (MEMVC) assembly generally designated 26 may include mold 27 having mold surface 28. MEMVC assembly 26 may also include powder box 29 having disposed therein plastic powder 31. In MEMVC assembly 26, mold 27 and powder box 29 may each be formed to hold vacuum pressure when engaged with each other (discussed below). In other words, mold 27 and power box 29 may be capable of vacuum loading. Powder box 29 may include vacuum connection 32 for drawing and releasing vacuum by means of a conventional pump (not shown). Additionally, powder box 29 may include vacuum rated seal 33 for maintaining a seal between itself and mold 27.

Mold 27 may be made of a metal such as nickel, a metallic material, or any equivalent material known in the art. Plastic powder 31 may be a powder such as Thermo Plastic Urethane (T.P.U.), Thermo Plastic Olefinic (T.P.O.), Poly Vinyl Chloride (P.V.C.), or any equivalent material that may be used with mold 27 to form a cast product. Additionally, plastic powder 31 may have a fine or granulated composition, or may be a liquid. Vacuum connection 32 and vacuum rated seal 33 may be placed on powder box 29 (as shown in FIG. 4A), or may likewise be placed on mold 27.

As shown next in FIG. 4A, in order to cast plastic powder 31 into the shape of mold surface 28, mold 27 may first be heated to a predetermined optimum molding temperature. As shown in FIGS. 4A and 4B, powder box 29 may then be brought into contact with mold 27 and engaged with it in order to prevent leakage of plastic powder 31. Next, as shown in FIG. 4B, air present in the enclosed area defined by mold surface 28 and the inner surface of powder box 29 may be removed through vacuum connection 32 to simultaneously form a seal between mold 27 and powder box 29 via vacuum rated seal 33. The vacuum level may range between atmospheric and absolute vacuum. As shown in FIG. 4C, mold 27 may now be rotated, at which state plastic powder 31 strikes heated mold surface 28. After a predetermined time period, the rotation of mold 27 is stopped as shown in FIG. 4D and the vacuum within the enclosed area discussed above is released. At this stage in FIG. 4D, when mold 27 stops rotating, plastic powder 31 on mold surface 28 fuses to form the shape of mold surface 28. Any remaining plastic powder 31 drains back into powder box 29 for subsequent casting, or may be discarded. As shown next in FIG. 4E, powder box 29 may now be disengaged from mold 27 and returned to its original location (shown also in FIG. 4A). Finally, as shown in FIG. 4F, mold 27 may be rotated to a predetermined orientation to allow an operator to remove the fused layer (or skin) on mold surface 28.

In the first, second and third preferred embodiments of the MEMVC assembly discussed above, it should be noted that mounting separate vacuum elements on mold 6 and powder box 8 (first embodiment), and on mold 17 (second embodiment), may virtually eliminate pressure on these members (6, 8 and 17) related to vacuum loading. Therefore, for the first and second embodiments, it may only be necessary to modify mold 6 and powder box 8, and mold 17, respectively, in order to attach vacuum elements 11 and 12, and 22, respectively. On the contrary, for the second and third embodiments discussed above, it may be necessary to reinforce powder box 19, and mold 27 and powder box 29, respectively, in order for these members (19, 27 and 29) to withstand the pressure associated with vacuum loading. Moreover, in the first through third embodiments discussed above, it may be necessary to attach one or more latches onto the respective molds, powder boxes, and/or vacuum elements, in order to permit access to the mold surface for removal of the cast skin, and/or introduction of additional plastic powder between cycles. Additionally, in the first through third embodiments discussed above, molds 6, 17 and 27, respectively, may be heated in a hot air furnace (not shown) to a predetermined optimum molding temperature, or may instead be heated to the optimum molding temperature by any equivalent method known in the art.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A multi element moving vacuum chamber for rotational casting, said multi element moving vacuum chamber comprising:

a mold having a predefined shape and an axis of rotation, said mold being rotatable about said axis of rotation, said mold further having an inner mold surface and an outer mold surface;

a box containing casting material, said box having an inner box surface for holding said casting material and an outer box surface; and at least one vacuum element mounted to one of said outer mold surface and said outer box surface, thereby defining a vacuum element mounted component and a non-vacuum element mounted component, said non-vacuum element mounted component being capable of vacuum loading, wherein said mold is detachably engageable with said box, and said at least one vacuum element is detachably engageable with said non-vacuum element mounted component, to define an engaged configuration, and wherein when said mold and said box, and said at least one vacuum element and said non-vacuum element mounted component, are in said engaged configuration, air within an enclosure defined by said inner mold surface and said inner box surface, and further defined by an outer surface of said vacuum element mounted component and an inner surface of said at least one vacuum element, may be removed to create a vacuum.

2. The multi element moving vacuum chamber of claim 1, wherein said mold is made of Nickel or another metal.

3. The multi element moving vacuum chamber of claim 1, wherein said casting material is at least one of Thermo Plastic Urethane (T.P.U.), Thermo Plastic Olefinic (T.P.O.), Poly Vinyl Chloride (P.V.C.), and a castable plastic.

4. The multi element moving vacuum chamber of claim 1, wherein said at least one vacuum element is bell shaped.

5. The multi element moving vacuum chamber of claim 1, wherein said at least one vacuum element further comprises at least one vacuum connection for removal of air from an enclosed area defined by said inner surface of said at least one vacuum element and said vacuum element mounted component, and wherein said non-vacuum element mounted component further comprises at least one vacuum connection for removal of air from an enclosed area defined by said inner mold surface and said inner box surface.

6. The multi element moving vacuum chamber of claim 1, wherein said at least one vacuum element further comprises at least one vacuum connection for removal of air from an enclosed area defined by said inner surface of said at least one vacuum element and said vacuum element mounted component, and further defined by said inner mold surface and said inner box surface, and wherein said non-vacuum element mounted component further comprises at least one vacuum connection for removal of air from an enclosed area defined by said inner mold surface and said inner box surface.

7. The multi element moving vacuum chamber of claim 1, wherein at least one of said mold, said at least one vacuum element, and said box further comprise at least one vacuum rated seal for providing sealed engagement between each of said mold and said box, and said at least one vacuum element and said non-vacuum element mounted component.

8. The multi element moving vacuum chamber of claim 1, wherein at least one of said mold, said box and said at least one vacuum element further comprise at least one latch for permitting said detachable engagement between said mold and said box, and said at least one vacuum element and said non-vacuum element mounted component.

9. A method for rotatable casting, comprising:
providing a mold having a predefined shape and an axis of rotation, said mold further having an inner mold surface and an outer mold surface;
providing a box containing casting material, said box having an inner box surface for holding said casting material and an outer box surface, said box further being located relative to said mold at a first location;
mounting at least one vacuum element to one of said outer mold surface and said outer box surface, thereby defining a vacuum element mounted component and a non-vacuum element mounted component, said non-vacuum element mounted component being capable of vacuum loading;
heating said mold to a predetermined temperature;
moving said mold relative to said box to engage said mold with said box, thereby defining an engaged configuration; and
removing air within an enclosure defined by an inner surface of said at least one vacuum element and an outer surface of said vacuum element mounted component, and by said inner mold surface and said inner box surface, in order to create a vacuum in said enclosure.

10. The method of claim 9, further comprising:
rotating said mold and said box in said engaged configuration for a predetermined time-period;
releasing said vacuum;
disengaging said mold from said box;
moving said box away from said mold to a second location; and
rotating said mold to a predetermined orientation for removal of cast material.

11. The method of claim 9, wherein said mold is made of Nickel or another metal.

12. The method of claim 9, wherein said casting material is at least one of Thermo Plastic Urethane (T.P.U.), Thermo Plastic Olefinic (T.P.O.), Poly Vinyl Chloride (P.V.C.), and a castable plastic.

13. The method of claim 9, wherein said at least one vacuum element is bell shaped.

14. The method of claim 9, wherein said removal of air within said enclosure occurs through at least one vacuum connection mounted on at least one of said mold, said at least one vacuum element and said box.

15. The method of claim 9, wherein in said engaged configuration, said enclosure is sealed from air by at least one vacuum rated seal mounted on at least one of said mold, said at least one vacuum element and said box.

16. The method of claim 9, wherein said mold, said box and said at least one vacuum element are engageable by at least one latch mounted on at least one of said mold, said box and said at least one vacuum element.

17. The method of claim 9, wherein said removal of air induces a vacuum level between atmospheric and absolute vacuum.

18. The multi element moving vacuum chamber of claim 1, further comprising:
at least one additional vacuum element mounted to said non-vacuum element mounted component,
wherein when said mold and said box, and said at least one vacuum element and said non-vacuum element mounted component, are in said engaged configuration, air within an enclosure defined by said inner mold surface and said inner box surface, by an outer surface of said vacuum element mounted component and an inner surface of said at least one vacuum element, and by an outer surface of said non-vacuum element mounted component and an inner surface of said at least one additional vacuum element, may be removed to create a vacuum.

19. The multi element moving vacuum chamber of claim 1, wherein said at least one additional vacuum element further comprises at least one vacuum connection for removal of air from an enclosed area defined by an outer surface of said non-vacuum element mounted component and an inner surface of said at least one additional vacuum element.

20. The multi element moving vacuum chamber of claim 1, wherein said at least one additional vacuum element further comprises at least)one vacuum connection for removal of air from an enclosed area defined by an outer surface of said non-vacuum element mounted component and an inner surface of said at least one additional vacuum element, and further defined by said inner mold surface and said inner box surface.

21. The method of claim 9, further comprising:
mounting at least one additional vacuum element to said non-vacuum element mounted component,
wherein when said mold and said box, and said at least one vacuum element and said non-vacuum element mounted component, are in said engaged configuration, air within an enclosure defined by said inner mold surface and said inner box surface, by an outer surface of said vacuum element mounted component and an inner surface of said at least one vacuum element, and by an outer surface of said non-vacuum element mounted component and an inner surface of said at least one additional vacuum element, may be removed to create a vacuum.

22. The method of claim 9, further comprising:
providing said at least one additional vacuum element with at least one vacuum connection for removal of air from an enclosed area defined by an outer surface of said non-vacuum element mounted component and an inner surface of said at least one additional vacuum element.

23. The method of claim 9, further comprising:
providing said at least one additional vacuum element with at least one vacuum connection for removal of air from an enclosed area defined by an outer surface of said non-vacuum element mounted component and an inner surface of said at least one additional vacuum element, and further defined by said inner mold surface and said inner box surface.

* * * * *